July 1, 1969

R. J. O'NEILL 3,452,869

SETTLING TANK AND METHOD OF OPERATION THEREOF

Filed Jan. 18, 1967

RAYMOND J. O'NEILL
INVENTOR.

BY

Townsend and Townsend

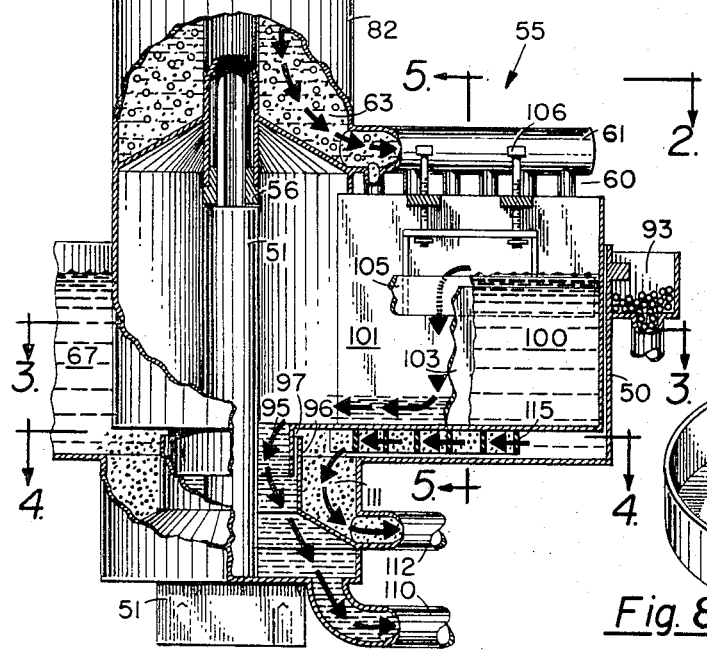
Fig. 6.
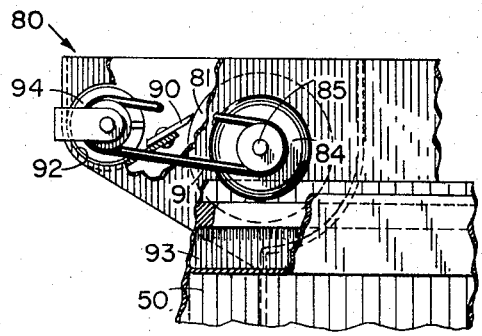
Fig. 7.
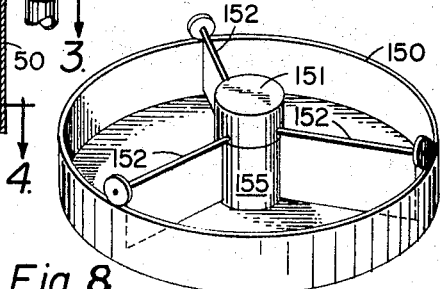
Fig. 8.
Fig. 9.
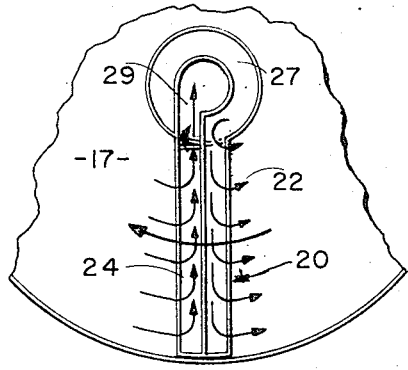
Fig. 1A.
RAYMOND J. O'NEILL
INVENTOR.
BY
Townsend and Townsend United States Patent Office 3,452,869
Patented July 1, 1969

3,452,869
SETTLING TANK AND METHOD OF
OPERATION THEREOF
Raymond J. O'Neill, Berkeley, Calif., assignor to
De Laval, Inc., Millbrae, Calif.
Filed Jan. 18, 1967, Ser. No. 610,098
Int. Cl. B01d 21/06
U.S. Cl. 210—84                    17 Claims

ABSTRACT OF THE DISCLOSURE

A settling tank has a partitioning wall arranged for movement relative to the fluid in the tank, in which entry fluid is added to the tank adjacent the trailing side of the partitioning wall, and fluid is exhausted from the tank from adjacent the leading side of said partitioning wall.

*Objects and advantages*

This invention relates to a method of and means for separating a plurality of fluidized liquid or solid materials that are temporarily in a homogeneous state by gravitational forces acting upon the materials, each having a different specific gravity.

It is often necessary to separate materials from a fluid mixture by allowing the liquid to be in a sufficiently static state for a sufficient period of time to cause materials having a lighter specific gravity to flow to the top of the basic fluid and materials having a heavier specific gravity to settle to the bottom. In the aforesaid procedures, the time ratio for full classification of the heavier or lighter materials interferes with production rates. One of the problems frequently encountered in such separations is the turbulence created in the separation tank during the metering of the new fluids to the tank. This is further frustrated by the turbulence encountered by the removal of the separated materials.

The object of this invention is to maintain the fluid within the tank in a quiescent condition during the entry and removal of fluids and solids in order to reduce the settling time for separation and to prevent redispersion of materials which have been previously classified.

In order to acquire the aforesaid objectives, a novel process and mechanism has been afforded by which fluid is removed and entered from a moving wall in which the positive pressure which would normally be on the forward face of the wall is reduced by the expedient removal of the fluid adjacent the aforesaid forward face. At the same instant, the otherwise negative pressure areas on the trailing side of the barrier is neutralized by the addition of the new unclassified materials. In this way, relative movement between the barrier wall and the fluid can be maintained without the introduction of turbulence and pressures to other areas of the fluid bath, even those which are only slightly removed from the barrier wall or carriage proper.

A feature and advantage of this invention lies in the fact that the removal of fluids and solids is operable in a ratio which is equal to the addition of new materials, thereby maintaining the total fluid volume in the tank at equilibrium and affording an environment for continuous processing.

A feature and advantage of this invention lies in the fact that the barrier wall can carry mechanisms which will remove floated scum, central liquid and bottom material either separately or collectively in order to obtain the classified separation of the respective materials and in so doing maintains an avoidance of positive pressures in advance of the carriage.

A further feature and advantage of this invention lies in a novel delivery system located adjacent the trailing surface of said carriage which is adapted to deliver the input fluid in such a manner as to neutralize the negative pressure which would normally be encountered on the trailing side of the relatively moving carriage.

A still further object of this invention is to provide such delivery at low velocity input whereby the introduction of the new fluids occurs at substantially zero velocity so that forces which would otherwise cause turbulenec due to the fluid introduction are minimized. The aforesaid object is accomplished by floating the newly added fluid in a direction obversely facing the direction of movement of the carriage and at a velocity substantially equal to the relative movement of the carriage.

Another feature and advantage of this invention lies in the fact that new materials are added sequentially over the tank area in such a manner as to avoid the necessity of the added materials forming their own outwardly projecting migrations as occurs when entry fluids are continuously entered from a single position within a tank. In this manner, the relative position of new fluid entry is constantly changing through the movement of the carriage thereby causing a wide field of dispersion of newly entered materials, the aforesaid entry being further disposed to entry under extremely static conditions.

Other objects, features, and advantages of the present invention will be more apparent after referring to the following specification and accompanying drawings in which:

FIG. 1a is a schematic view thereof.

FIG. 6 is an elevational view with a portion broken away to show the view of the carriage with a portion broken away to show the inner structure thereof.

FIG. 7 is a large fragmentary view of the cross-section of the skimmer apparatus.

FIG. 8 is a schematic of an embodiment incorporating a plurality of carriages within a single tank; and FIG. 9 is a further embodiment incorporating separating baffles within a tank separating various delivery sections of the carriage.

Figure 1:
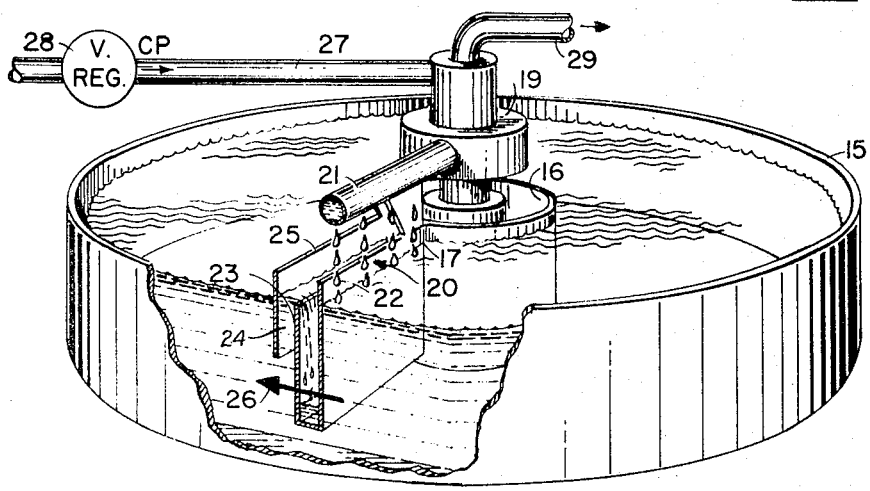
FIG. 1 is a diagrammatic view of the simplest element of the invention.

Shown in FIG. 1 is the invention in its simplest form in which there is provided a settling tank 15 having a center pedestal 16 having a rotating head 19 and means mounted within the pedestal for rotating head 19 at a predetermined, fixed velocity. A carriage or vane 20 is connected radially from rotating head 19. The carriage engages the outer wall of pedestal 16 and the inside wall of tank 15 and terminates on its bottom edge slightly above the bottom of the tank. Carriage 20 thus rotates around the tank and forms a curtain or barrier wall which progessively rotates through the liquid bath 17 within the tank. The top of the pedestal is situated above the upper surface of liquid bath 17.

It can be seen that the rotation of the carriage would normally tend to cause a substantial positive pressure on the forward or lead side of the carriage and a negative pressure on the trailing side. In the present invention fluid is added on the negative side and subtracted from the positive side in an adjustment which is calculated to neutralize both the negative and positive pressures and, in so doing, allows the vane or carriage to rotate within fluid bath 17 causing a minimum turbulence and turbulent creating pressures. At the same time, both the addition and subtraction of materials perform the necessary functions of settling tank operations of new unclassified materials and removal of the materials which have been gravity classified.

Addition of new materials is accomplished by a manifold 21, mounted on the trailing upper edge of carriage 20, arranged to deliver input liquid directly into the material at 22. The forward edge of the carriage is provided with a barrier weir 23 with its top edge arranged to provide a weir and having on the opposite side of barrier weir 23 an overflow space 24 in which the material is overflowed and thence removed from the tank without adding pressures to the tank. A barrier wall 25 is mounted on the forward top edge of carriage 20 and depends slightly below the top surface of liquid bath 17 to prevent the top floated materials from being withdrawn from the tank.

As can be seen, the carriage moves in a clockwise direction as indicated by arrow 26 so that forward movement of the carriage causes fluid in the central part of the tank to be raised and overflowed into chamber 24. At the same time, new material is added at 22 from manifold 21. The new material is delivered to rotating head 19 via a coaxial conduit 27 and is regulated in pressure by a pressure or fluid rate regulating valve 28 coaxially mounted within tube 27. An overflow delivery tube 29 is connected to outflow column 24 so that material is continually removed from the tank through a coaxial pipe. The pipe, of course, is connected to rotating head 19 by means of conventional fluid type couplings.

Pressure valve 28 is regulated so that the inflow of new materials will be equal to the outflow from tube 29. This, in turn, is also adjusted to the rate of rotation of carriage 20 in that it is desired for minimum turbulence to have the fluid input at 22 balanced to fill the void created by forward carriage movement and thus immediately neutralize any negative pressure which would normally exist on the trailing side of the carriage by the addition of appropriate quantities of new materials.

It is believed apparent that tank 15 can be rotated while carriage 20 remains stationary to accomplish the aforesaid results.

In the device shown in FIGS. 2, 3, 4, 5, 6 and 7, the aforesaid principle of operation is combined with apparatuses for skimming the top surface of a bath, removing the central or body portion of the bath and further apparatus for removing materials settled to the bottom of the tank, all of which functions are enhanced and facilitated by the movement of the fluid delivery carriage through the tank, thereby providing an apparatus in which a single device or carriage functions for both the addition and removal of materials from the tank.

A tank 50 is arranged with a pedestal 51 having rotatably supported thereon a carriage 55. The carriage is rotatably supported on pedestal 51 by internal bushings 56 and 57 and is rotated through a chain drive mechanism 58. The chain drive mechanism is rotated via sprocket 59 by a motor, not shown, in order to cause the carriage 55 to rotate about pedestal 51. The trailing side of carriage 55 is provided with a plurality of depending delivery tubes 60 interconnected by a horizontal delivery manifold 61 which is fed with input materials from a circular sump 63 mounted around the hub of the carriage. Delivery tubes 60 are provided with a plurality of exit apertures 64 which are located below the surface 65 of the fluid bath 67. Unclassified fluid is delivered to sump 63 by a delivery tube 69 in a manner so as to maintain the level of the unclassified fluid within sump 63 at a predetermined height as indicated at 70. The height of the fluid at 70 determines the height or pressure of the fluid at the exit apertures 64 and thus regulates the outlet velocity of the fluid from the ports. By regulating the speed of rotation of carriage 55 at a speed rate equal to the exit velocity of the unclassified fluid leaving the exit apertures 64, the fluid can leave the apertures at a zero or near zero velocity because of the cancelling velocity of carriage movement and outflow fluid.

Figure 3:
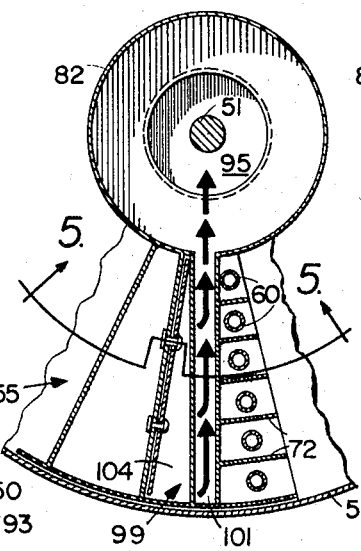
FIG. 3 is a cross-sectional view of the mid-portion of said carriage.
Figure 4:
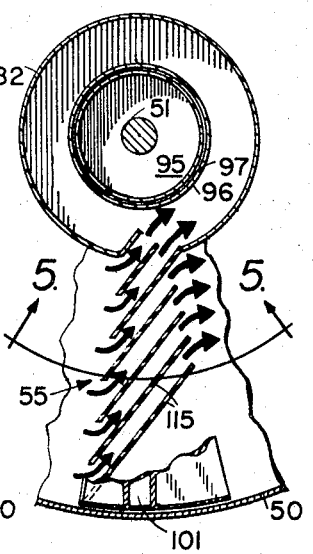
FIG. 4 is a similar cross-sectional view showing the near bottom cross-section thereof.

As can be seen in FIG. 3, separating baffles 72 can be dispersed between delivery tubes 60 to further reduce interaction and turbulence. In this case, the apertures can even face forward to obtain the cancelling velocity effect because of the fact that the inflow is deflected rearwardly by the carriage and baffle walls.

The central portion of the carriage is provided with means for removing the classified basic fluid by forcing the fluid over a weir for subsequent delivery to the central portion of the carriage. This is accomplished as can best be seen in FIG. 6 in which the carriage is provided with a hollow hub 95 which is nested on a sleeve 96 in which a fluid-tight bearing 97 is provided to prevent fluid communication directly to the hollow hub 95.

Figure 2:
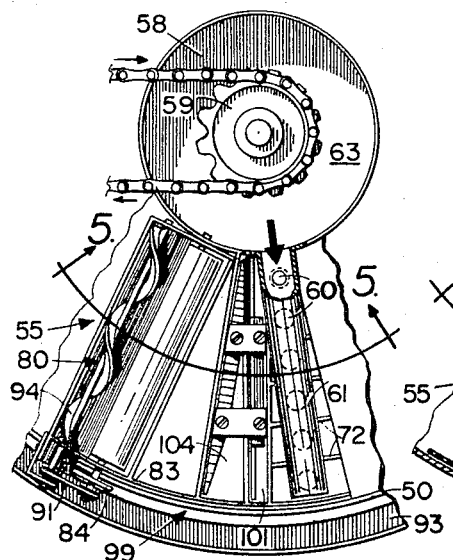
FIG. 2 is a top plan view of the fluid delivery and material pickup carriage.
Figure 5:
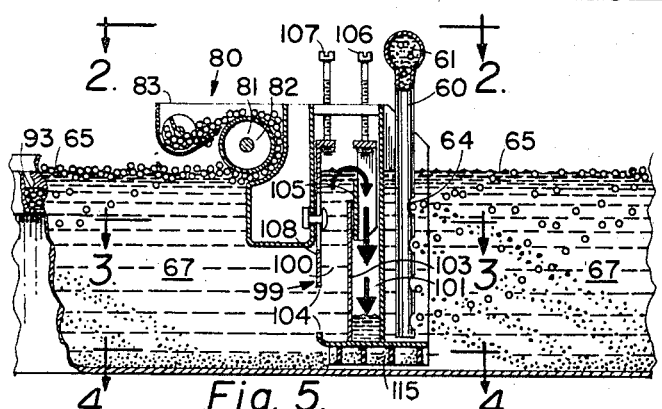
FIG. 5 is a sectional plan showing the side through the middle of the end of the carriage taken at line 5—5 of FIG. 2.

Structure 80 for skimming the top surface of a bath is shown in FIGS. 2 and 5 and includes a drum or roller 81 mounted by a bracket on the forward portion of carriage 55. The roller rotates about a shaft 82 journaled in any suitable manner in the bracket with the roller disposed to rotate in a counter-clockwise sense when viewing FIG. 5. This rotational movement of the roller causes floatable solids on the surface 65 to be drawn upwardly from the surface and then forwardly into a trough 90 (FIG. 7) in which an auger 94 is disposed. The auger rotates about an axis substantially parallel to that of roller 81 and power means, including a drive belt 91, rotates the roller and shaft in the proper direction to effect the movement of the floatable solids into trough 90 and then longitudinally thereof and outwardly of the tank into an annular trough 93 (FIGS. 2, 6 and 7) for discharging in some suitable manner, such as downwardly through a conduit as shown in FIG. 6. The rotation of roller 81 and auger 94 can be effected by any suitable device, such as a wheel 84 in rolling contact with the outer periphery 99 of the tank.

The laterally extending arm 99 of the carriage is compartmented into a lead compartment 100 and a trailing compartment 101 divided by a weir wall 103. The lead compartment 100 is formed in fluid communication with fluid bath 67 by an entrance aperture 104 which allows the fluid bath to enter the forward chamber 100 in such a way that the top portion of the fluid bath flows over the weir 105 mounted on the top of weir wall 103. The precise height of weir 105 can be adjusted by adjustment screw 106. Adjustment of the weir wall determine the height of fluid in the tank. In similar manner, entrance aperture 104 can be controlled by adjustment screw 107, said screw being arranged to vary the spacing of the forward wall 108 which defines the top portion of the entrance aperture 104. Fluid, after passing over weir 105, is then flowed to the hollow hub 95 from whence it is removed through outlet tubing 110.

The heavier particles in the tank are removed from a circular sump 111 via a tube 112 which is coaxially constructed around cylinder or sleeve 96. To obtain the delivery of the bottom materials to sump 111 a plurality of blades 115 causes a continual piping of materials on the bottom of the tank towards the central sump 111 at which the materials are outflowed to the sump and thereafter removed through output tube 112.

The embodiment as above described has shown and depicted the provision of removal of floated scum, central fluid and heavier sludge for the convenience of illustration. In more economical devices, the respective removal elements can be employed separately as well as in the threefold combination hereinabove set forth so long as enough fluid is withdrawn to eliminate or reduce positive forward pressure.

In FIG. 8, as schematically depicted, is a further embodiment of the invention in which a tank 150 is arranged with a hub 151 having three carriages 152, each of which is identical to carriage 55, mounted on a column 155. Such a construction would be particularly suitable for extremely large settling tanks where the rotational rate of the carriages is relatively slow and in other installations in which the settling rate of the materials is more rapid.

In FIG. 9, a tank 160 is arranged with a pedestal 161 having a three segmented carriage 162. The respective segments 163, 164, and 165 of the carriage are separated by coaxial baffles 168 and 169 respectively. By this means, lateral or radial turbulence, if occurring, can be reduced. It can thus be seen that in the present invention the fluid is metered into the settling tank into multiple coaxial zones to isolate turbulence which may occur to the zone in which it occurs.

It is to be understood that while the embodiments disclosed have described the carriage as being the moving element in the tank arrangement, as an equal alternative the carriage can remain stationary and the tank can be the moving entity. The essential element in the subject invention is the relative movement of the carriage with respect to the liquid in combination with the entry and withdrawal of fluids.

While one embodiment of this invention has been shown and described, it will be apparent that other adaptations and modifications can be made without departing from the true spirit and scope of the invention.

What is claimed is:

1. Fluid settling apparatus comprising: a fluid settling tank adapted to contain a liquid solution therein, a generally imperforate barrier wall within the tank and disposed for dividing said liquid into a first area immediately adjacent one side of said barrier wall and a second area separate from the first area and disposed immediately adjacent the opposite side of said barrier wall, means coupled to said tank and said barrier wall for moving the same relative to each other in a direction to effect relative movement of said barrier wall with respect to said liquid toward said first area and away from said second area, means adjacent to the first area for withdrawing liquid therefrom as the barrier wall and the tank move relative to each other, and means adjacent to the second area for adding liquid thereto as the barrier wall and the tank move relative to each other.

2. In combination, a tank adapted to receive a liquid bath, a carriage, means mounting said carriage in the tank for movement relative thereto and in a location for separating a pair of adjacent liquid-receiving areas thereof, means for causing relative movement between said carriage and the tank in a predetermined direction at a predetermined rate, fluid delivery means mounted adjacent said carriage formed with an exit port having its discharge end disposed on the trailing side of said carriage for discharging fluid into one of said areas, and fluid intake means mounted adjacent the lead side of said carriage to withdraw fluid from the other area.

3. The combination according to claim 2 having means for regulating the rate of withdrawal of fluid from said intake means to substantially equal the displacement caused by the relative movement of the carriage.

4. The combination according to claim 2 and having means for regulating the amount of fluid delivery from said fluid delivery means to equal the fluid displacement on the trailing side of said carriage due to the movement of said carriage relative to said liquid bath.

5. A combination according to claim 2 and wherein said causing means includes structure coupled to said carriage for regulating its velocity with respect to the velocity of the outflow of the liquid from said exit port, whereby the two aforesaid velocities are substantially equal to cause the fluid delivery to be at zero velocity into said fluid bath.

6. A method of adding and withdrawing liquid from a settling tank having a barrier wall therein at a location to separate a liquid in the tank into two adjacent areas comprising: moving the barrier wall relative to and through the liquid within the tank, adding new liquid to the tank adjacent to the downstream side of the barrier wall at a rate substantially equal to the volume of displacement caused by the relative movement of the barrier wall through said liquid, and withdrawing liquid from the upstream side of the barrier wall at a rate equal to the volume of liquid displacement caused by the relative movement of the barrier wall through the liquid.

7. In combination, a cylindrical tank, a pedestal mounted axially of said tank, a liquid bath within said tank disposed between the outer wall of said pedestal and the inner wall of said tank, a carriage including a barrier wall rotatably mounted on said pedestal and extending into said fluid bath from the outer wall of said pedestal to the inside wall of said tank to separate the liquid bath into two areas, means causing relative rotation of said carriage with reference to said tank at a predetermined rate, fluid pick-up means coupled to said carriage for withdrawing liquid from the bath area adjacent the leading side of said carriage and delivery means coupled to said carriage for adding fluid to said bath area adjacent the trailing side of said carriage.

8. A combination according to claim 7 and having means for regulating the rate of fluid delivery from said delivery means to equal the rate of fluid withdrawal from said fluid pick-up means.

9. A combination according to claim 7 having means regulating the rate of fluid withdrawal from said fluid pick-up means at a rate equal to the fluid displacement caused by the leading side of said carriage because of movement through said bath, and means regulating said delivery means to cause the rate of fluid delivery to be equal to the volume of fluid displacement caused on the trailing side of said carriage because of movement through said liquid bath.

10. A combination according to claim 7 having a plurality of coaxial baffles disposed about said pedestal and said carriage being segmented for movement in the respective areas between baffles.

11. A combination according to claim 7 having a plurality of carriages and means for maintaining a constant spacing between carriages.

12. A combination according to claim 7 and wherein said fluid pick-up means comprises a skimmer mechanism having a horizontal drum, means to remove material from said drum, and means to remove the material from said drum to a position external said tank.

13. A combination according to claim 7 and wherein said fluid pick-up means comprises a plurality of inwardly directed vanes positioned on the bottom of said carriage to bias materials on the bottom toward the center of said tank, and means mounted at the bottom of said tank to remove materials biased to the center from said tank.

14. A combination according to claim 7 and wherein said fluid pick-up means comprises a pick-up aperture mounted on said carriage and disposed between the upper and lower level of said tank, and means to remove fluid passing through said aperture from said carriage to a position external to said tank.

15. In combination, a tank adapted to carry a working liquid bath, a pedestal axially mounted within said tank, a manifold rotatably mounted on said pedestal for rotation in a given direction and extending substantially to the wall of said tank, means coupled with said manifold for rotating the same at a predetermined rate, a plurality of fluid delivery elements depending into said tank from said manifold and in fluid communication therewith, each said fluid delivery element having fluid delivery apertures formed therein and positioned to be below the surface of the working liquid bath with the apertures facing in a direction substantially opposite to said given direction, and means for delivering fluid to the manifold and thereby to the fluid delivery apertures at a pressure to cause the rate of outflow of the fluid therein to be substantially equal to the rate of movement of said manifold.

16. A combination according to claim 15 having fluid pick-up means mounted on said manifold and depending into said tank, and means to withdraw fluid from said pick-up means at a rate substantially equal to the rate of fluid delivery from said fluid delivery apertures.

17. A combination according to claim 15 and wherein a plurality of fluid delivery elements are located at different radial positions on said manifold from said pedestal, and means regulating independently the fluid pressure at each of said fluid delivery elements in proportion to the radial velocity of said manifold in said tank to cause the outflow velocity of fluid from the fluid delivery apertures to be substantially equal to the radial velocity movement of the fluid delivery element in said tank.

References Cited

UNITED STATES PATENTS 2,185,785   11/1940   Dorr _____ 210—520 X

FOREIGN PATENTS 518,353   2/1940   Great Britain.

FRANK W. LUTTER, *Primary Examiner.*

U.S. Cl. X.R.

209—162; 210—520

UNITED STATES PATENT OFFICE
CERTIFICATE OF CORRECTION

Patent No. 3,452,869                                 July 1, 1969

Raymond J. O'Neill

It is certified that error appears in the above identified patent and that said Letters Patent are hereby corrected as shown below:

In the heading to the printed specification, line 5, "De Laval, Inc." should read -- De Laval Turbine, Inc. --.

Signed and sealed this 21st day of April 1970.

(SEAL)
Attest:

Edward M. Fletcher, Jr.                      WILLIAM E. SCHUYLER, JR.
Attesting Officer                               Commissioner of Patents